United States Patent
Lindner et al.

[11] Patent Number: 5,915,931
[45] Date of Patent: Jun. 29, 1999

[54] MAGNETIC DRIVE UNIT HAVING MOLDED PLASTIC MAGNETIC DRIVER

[75] Inventors: Darrell M. Lindner; James R. Flory, both of Ashland; Cecil Flynn, Bellville, all of Ohio

[73] Assignee: The Gorman-Rupp Company, Mansfield, Ohio

[21] Appl. No.: 08/970,243

[22] Filed: Nov. 13, 1997

[51] Int. Cl.$^6$ ............................................. F04B 17/00
[52] U.S. Cl. ................ 417/420; 417/423.1; 417/423.12; 464/29
[58] Field of Search .............................. 417/423.12, 420, 417/423.1; 464/29

[56] References Cited

U.S. PATENT DOCUMENTS

| | | | |
|---|---|---|---|
| 3,938,914 | 2/1976 | Zimmermann | 417/420 |
| 4,080,112 | 3/1978 | Zimmermann | 417/420 |
| 4,850,818 | 7/1989 | Kotera | 417/366 |
| 5,501,582 | 3/1996 | Gautier et al. | 417/420 |

*Primary Examiner*—Charles G. Freay
*Assistant Examiner*—Ehud Gartenberg
*Attorney, Agent, or Firm*—Renner, Kenner, Greive, Bobak, Taylor & Weber

[57] ABSTRACT

A pump (10) includes a housing (16) having an inlet port (42) and an outlet port (43). An impeller (15) is received within the housing (16) and carries a magnet (34). A motor (11) rotates a shaft (17) having a threaded end (52). A plastic driver magnetic unit (12) is formed of a magnetized material and includes a base (47) and a generally cylindrical sidewall (48). At least a portion of the sidewall (48) is magnetized. A threaded insert (49) is positioned in the base (47) of the driver unit (12) and is threaded onto the shaft (17) of the motor (11) until a stop shoulder (53) formed on the shaft (17) is engaged by the insert (49). Such aligns the magnetized portion of the sidewall (48) of the driver unit (12) with the magnet (34) of the impeller (18) such that upon rotation of the motor shaft (17), the driver unit (12) rotates the impeller (15) and fluid is drawn into the housing (16) through the inlet port (42) and transferred out of the housing (16) through the outlet port (43).

19 Claims, 2 Drawing Sheets

MAGNETIC DRIVE UNIT HAVING MOLDED PLASTIC MAGNETIC DRIVER

TECHNICAL FIELD

The present invention generally relates to magnetic driven units. More particularly, this invention relates to a magnetic drive unit which can be used in a pump wherein a plastic driver magnet rotates a magnetized impeller.

BACKGROUND ART

Magnetic drive units, such as the type utilized in pumps, are well known in the art. It is known, for example, that molded plastic driver magnets can be used in such pumps. Typically, a driver magnet is rotated by a motor-driven shaft. By magnetic force, the rotating driver magnet causes a coaxial magnet carried by an impeller to rotate. Consequently, vanes on the impeller then force a liquid to exit through a discharge outlet.

Some driver magnets known in the art contain a sintered ceramic magnet cemented or otherwise attached to a plastic or metal hub that can be threaded onto a motor shaft. Attaching a ceramic magnet to a hub, however, is cumbersome and expensive to manufacture.

The present invention is advantageous in that it utilizes a molded plastic magnetic driver and can include an insert assembly wherein the insert is threadably engaged to a motor shaft in a self-positioning and self-locking fashion. Therefore, the need exists for a one-piece molded plastic magnetic driver assembly that can be threaded onto a motor shaft.

DISCLOSURE OF THE INVENTION

It is therefore an object of the present invention to provide a magnetic drive unit wherein a molded plastic magnetic driver is threaded to a shaft.

It is an additional object of the present invention to provide a magnetic drive unit which is particularly suited for use in a pump whereby the interaction of a driver magnet and an impeller magnet will transfer a fluid.

It is another object of the present invention to provide a pump, as above, in which the driver magnet may be easily attached to the motor shaft in such a way that it is automatically positioned thereon and locked thereto.

It is a further object of the present invention to provide a pump, as above, that is durable and inexpensive to manufacture and maintain.

These and other objects of the present invention, as well as the advantages thereof over existing prior art forms, which will become apparent from the description to follow, are accomplished by the improvements hereinafter described and claimed.

In general, a device for driving a magnetized member includes a motor which rotates a shaft having a threaded end. A driver unit is formed of a plastic and magnetic material and has a portion thereof magnetized. The unit is threaded onto the threaded end of the shaft so that the magnetized portion may be positioned adjacent to the member such that upon rotation of the shaft by the motor, the unit drives the member.

The device can be used in a pump for moving fluid. The pump includes a housing having a fluid inlet port and a fluid outlet port. The member to be driven is an impeller positioned in the housing. The impeller carries a magnet and moves fluid from the inlet port to the outlet port. The magnetized portion of the driver unit is positioned adjacent to the impeller magnet such that upon rotation of the shaft by the motor, the magnetic force from the hub rotates the impeller to move the fluid.

A preferred exemplary magnetic drive unit, particularly as used in a pump, incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
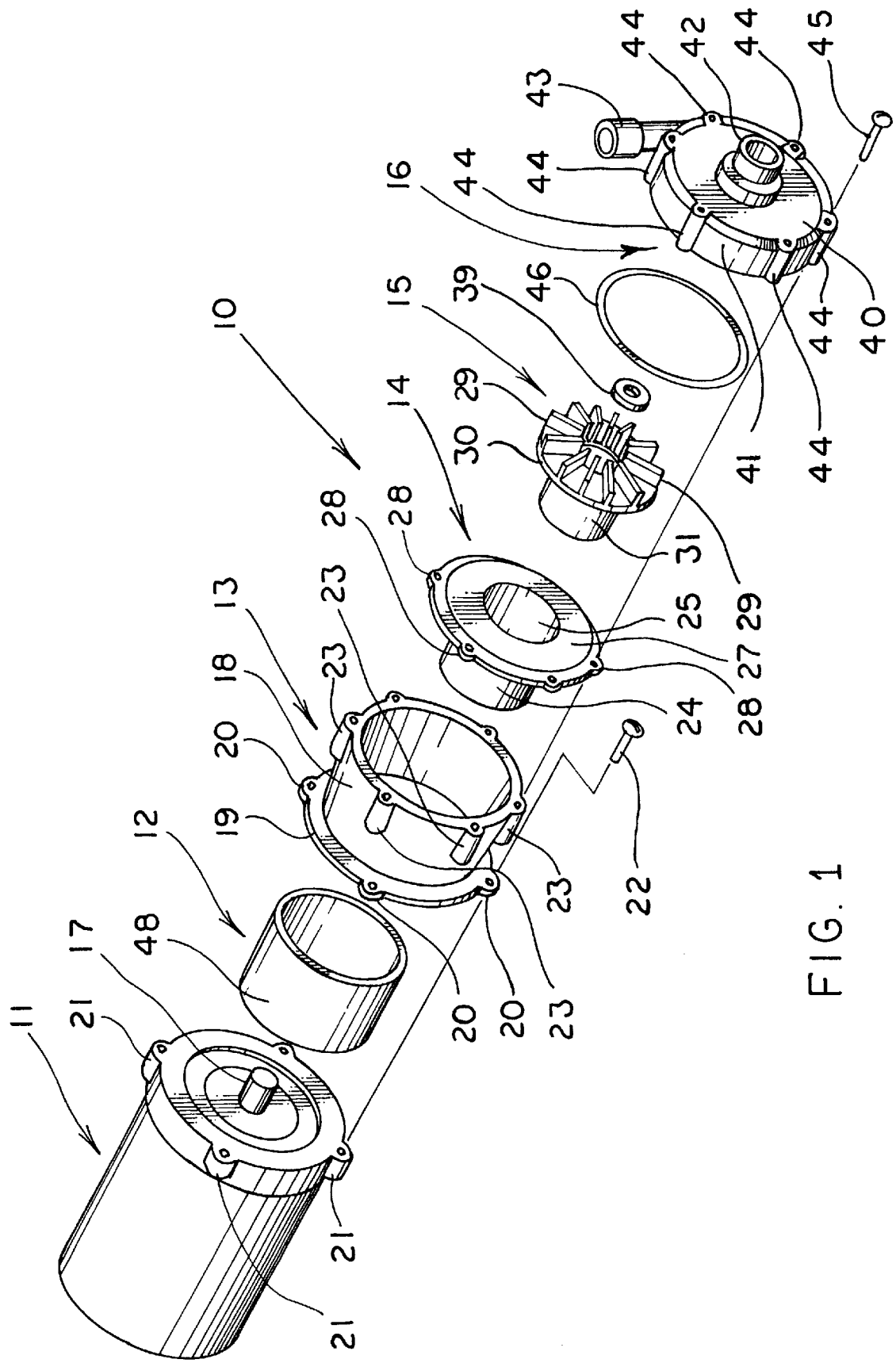
FIG. 1 is a somewhat schematic exploded view of a magnetic drive pump having a magnetic drive unit made in accordance with the present invention.

A magnetic drive pump having a magnetic drive unit made in accordance with the concepts of the present invention is indicated generally by the numeral 10 in the drawings. As shown in FIG. 1, the primary components of pump 10 include a motor 11, a driver magnet unit 12, a coupling head 13, a pump adapter 14, an impeller assembly 15, and a pump housing 16.

As will hereinafter be described in more detail, motor 11 drives a motor shaft 17 which carries driver magnet unit 12. Coupling head 13 is a hollow member having a generally cylindrical wall 18. Driver magnet unit 12 is rotatably received within wall 18 of head 13. A peripheral flange 19 extends outwardly from wall 18 and is formed with circumferentially spaced apertured lugs 20. Motor 11 is provided with similar apertured lugs 21 which, when aligned with lugs 20, provide a means by which head 13 is attached to motor 11 as by cap screws 22 or the like. Circumferentially spaced, axially extending, apertured bosses 23 are formed on the outside of wall 18.

Pump adapter 14 includes a cup-like member having a cylindrical sidewall 24, an opening 25 on one end thereof, and a base 26 (FIG. 2) closing the other end thereof. When pump 10 is assembled, sidewall 24 of the cup-like member is received within and spaced from driver magnet unit 12. Adapter 14 is also provided with a peripheral flange 27 having circumferentially spaced apertured lugs 28 formed thereon.

Figure 2:
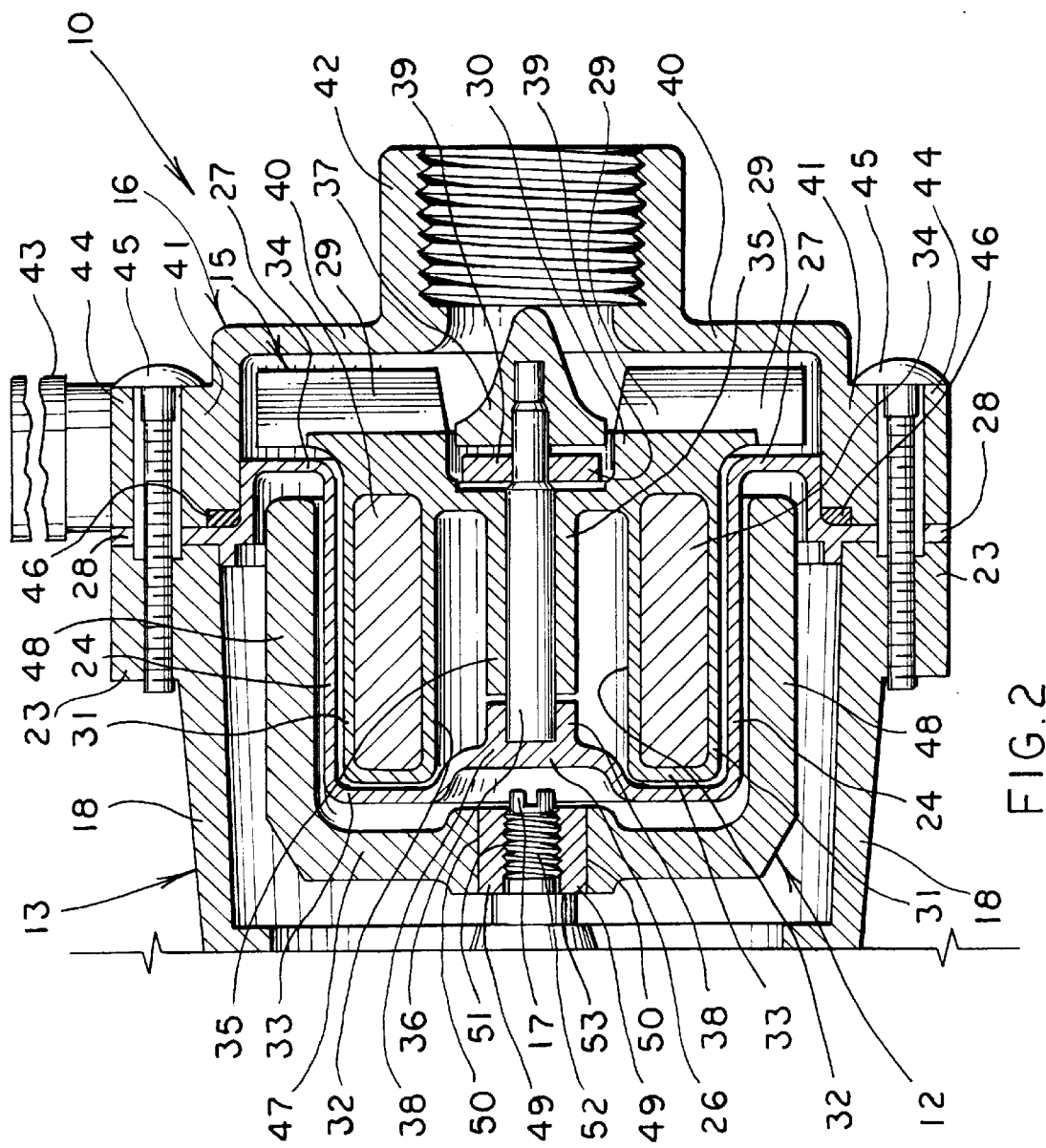
FIG. 2 is a longitudinal cross section of an assembled magnetic drive pump having a magnetic drive unit made in accordance with to the present invention.

As shown in FIG. 2, impeller assembly 15 includes a plurality of conventional impeller blades 29 carried by an impeller wall 30. A generally cylindrical outer wall 31 is formed at the periphery of wall 30 and a generally cylindrical inner wall 32 extends from wall 30 and is radially spaced from wall 31. Walls 31 and 32 are interconnected by a ring-shaped wall 33 and together walls 30, 31, 32, and 33 form a compartment for a ring-shaped magnet 34.

Impeller assembly 15 also includes a hollow hub 35 extending from wall 30 and spaced from inner wall 32. Hub 35, and therefore impeller assembly 15, is carried by a stationary shaft 36 which extends from a socket 37 formed in pump body 16 through hub 35 and into a socket 38 formed in pump adapter base 26. A thrust bearing 39 may be provided between impeller wall 30 and socket 37.

Pump housing 16 includes a generally circular face plate 40 having a cylindrical body 41 extending axially therefrom.

Fluid enters body 16 through an axial inlet port 42 formed in plate 40, and under the influence of impeller blades 29, the fluid is discharged tangentially through an outlet port 43. Body 41 is provided with a plurality of circumferentially spaced, axially extending, apertured bosses 44. Coupling head 13 permits the pumping portion of pump 10 to be attached to the motor portion thereof. To this end, a plurality of machine screws 45 which extend through bosses 44 of pump housing 16, through lugs 28 of pump adapter 14, and into bosses 23 of coupling head 13. An O-ring 46 is provided between cylindrical body 41 of pump housing 16 and peripheral flange 27 of pump adapter 14 to provide a static fluid seal therebetween.

As shown in FIG. 2, driver magnet unit 12 is cup-shaped in nature having a base 47 and a generally cylindrical sidewall 48 extending axially from the periphery of base 47. Unit 12 is made of a molded plastic containing a magnetic material. In the preferred embodiment, nylon resin is mixed with a ferrite powder and injected into the mold. At least a portion of, and preferably a majority of, sidewall 48 can be magnetized by properly orienting the magnetic material in the desired number of poles. Such can be conveniently accomplished by providing a number of magnets at predetermined positions in the mold so that sidewall 48 is magnetized during the molding process. Alternatively, or additionally, unit 12 can be magnetized after it is removed from the mold.

The important aspect is, however, that the portion of sidewall 48 which is magnetized be circumferentially adjacent to impeller magnet 34 when pump 10 is assembled. Such positioning is assured by the manner in which unit 12 is affixed to motor shaft 17. To that end, a metallic insert 49 may be positioned in base 47 of unit 12. Insert 49 may be made of any suitable metallic material, such as aluminum, and may be affixed in base 47 by any known means. Preferably, a conventional insert molding process may be used, that is, insert 49 may have a knurled outer surface and be positioned in the mold when unit 12 is being formed and, as such, it is permanently affixed to base 47 thereof.

Insert 49 is provided with internal threads 51 to engage threads 52 of motor shaft 17. In this regard, the threads 51 and 52 are designed (with either right hand or left hand threads) so that as motor shaft 17 turns, unit 12 becomes more locked thereto and thus does not come loose upon rotation of shaft 17. Unit 12 is automatically axially positioned relative to impeller magnet 34 by means of a stop shoulder 53 formed on motor shaft 17. Thus, unit 12 is threaded onto motor shaft 17 until insert 49 engages shoulder 53. Alternatively, by utilizing plastics of sufficient strength to form unit 10, insert 49 may not be necessary. To that end, an aperture 50 which could be formed in base 47 would be threaded, in a right hand or left hand manner as discussed above, and base 47 would engage stop shoulder 53.

In operation, upon rotation of motor shaft 17, unit 12 rotates and the magnetic force created by the composition of sidewall 48 acts upon impeller magnet 34 to rotate impeller 15 on its shaft 36. By such action, impeller vanes 29 cause the fluid to enter pump housing 16 through inlet port 42 and discharge fluid through outlet port 43.

It should thus be evident that a magnetic drive pump made in accordance with the concepts of the present invention can be used to pump a fluid using a plastic driver magnet that is self-positioning and self-locking. As such, the pump accomplishes and otherwise substantially improves the art.

What is claimed is:

1. A pump for moving fluid comprising a housing having a fluid inlet port and a fluid outlet port, an impeller in said housing to move fluid communicating with said inlet port through said outlet port, a magnet carried by said impeller, a motor, a shaft driven by said motor and having a threaded end, and a plastic unit formed of a plastic and magnetic material having at least a portion thereof magnetized, said unit engaging said threaded end of said shaft so that said portion of said unit is positioned adjacent to said magnet such that upon rotation of said shaft by said motor said unit rotates said impeller to move the fluid.

2. A pump according to claim 1 further comprising a stop shoulder on said shaft, said unit being threaded onto said shaft until it contacts said shoulder.

3. A pump according to claim 1 further comprising a threaded insert carried by said unit to engage said threaded end of said shaft.

4. A pump according to claim 3 wherein said insert is made of a metallic material.

5. A pump according to claim 3 wherein said insert is threaded in a direction on said shaft such that upon rotation of said shaft, said unit is locked onto said shaft.

6. A pump according to claim 1 wherein said unit is generally cup-shaped having a base and a generally cylindrical sidewall.

7. A pump according to claim 6 further comprising a threaded insert carried by said base, said insert engaging said threaded end of said shaft.

8. A pump according to claim 6 wherein said portion of said unit is formed in at least a portion of said sidewall.

9. A pump according to claim 1 further comprising a coupling head, said coupling head having a generally cylindrical wall, said unit being rotatably received within said wall.

10. A pump according to claim 9 further comprising means to attach said coupling head to said motor.

11. A pump according to claim 9 further comprising a pump adapter, said pump adapter having a generally cylindrical sidewall received within said unit.

12. A pump according to claim 11 further comprising means to attach said housing and said pump adapter to said coupling head.

13. A pump according to claim 11 further comprising a stationary shaft carried between said pump adapter and said housing.

14. A pump according to claim 13 wherein said impeller includes a hollow hub, said stationary shaft being received within said hollow hub.

15. A pump according to claim 14 wherein said impeller includes a compartment spaced from said hollow hub, said compartment carrying said magnet.

16. Apparatus for driving a magnetized member comprising a motor, a shaft driven by said motor and having a threaded end, and a unit formed of a plastic and magnetic material having at least a portion thereof magnetized, said unit being threaded onto said threaded end of said shaft so that said portion may be positioned adjacent to the member such that upon rotation of said shaft by said motor, said unit drives the member.

17. Apparatus according to claim 16 further comprising a stop shoulder on said shaft, said unit being threaded onto said shaft until it contacts said shoulder.

18. Apparatus pump according to claim 17 further comprising a threaded insert carried by said unit to engage said threaded end of said shaft.

19. Apparatus according to claim 18 wherein said insert is threaded in a direction on said shaft such that upon rotation of said shaft, said hub is locked onto said shaft.

* * * * *